United States Patent [19]

Eden

[11] 4,249,143
[45] Feb. 3, 1981

[54] XENON FLUORIDE AND MERCURY CHLORIDE PHOTODISSOCIATION LASERS

[75] Inventor: J. Gary Eden, Bowie, Md.

[73] Assignee: The United States of America as represented by the Secretary of the Navy, Washington, D.C.

[21] Appl. No.: 33,298

[22] Filed: Apr. 25, 1979

[51] Int. Cl.³ .............................................. H01S 3/23
[52] U.S. Cl. ............................................. 331/94.5 G
[58] Field of Search ................... 331/94.5 G, 94.5 P, 331/94.5 PE

[56] References Cited

U.S. PATENT DOCUMENTS 4,087,763  5/1978  George et al. ................. 331/94.5 G

OTHER PUBLICATIONS

"VOV-Pumped HgCl Laser" by Eden; Applied Phys. Lett., vol. 33, No. 6, Sep. 15, 1978, pp. 495–497.

Primary Examiner—William L. Sikes
Attorney, Agent, or Firm—Robert S. Sciascia; William T. Ellis; Alan P. Klein

[57] ABSTRACT

An optically pumped laser which is operative by photolysis of a rare gas (RG)-halogen atom (X) compound (RGX$_2$) which creates lasing from the RGX* molecule the RGX* molecule being diatomic. This type of laser is gaseous but a solid fuel is used to supply the gas; therefore the system is self contained.

19 Claims, 7 Drawing Figures

XENON FLUORIDE AND MERCURY CHLORIDE PHOTODISSOCIATION LASERS

BACKGROUND OF THE INVENTION

This invention relates to optically excited lasers and more particularly to optically pumped lasers that use high radiative efficiencies of electronically excited, rare gas dimers.

It is well known in the laser art that laser systems include three main components; the laser medium, which may be gaseous or a solid; the laser cavity which includes reflective surfaces; and a means for pumping the laser medium to an excited state. The laser medium may be optically pumped, or electronically or chemically excited and may be operated continuously or pulsed. Such laser systems are operated at room temperature and very low temperature such as a liquid nitrogen temperature. Further, laser systems may be operated in or outside the visible spectral region. They may be high power or low power. Such laser systems have been developed using a variety of elements, compounds, gases or fluids and all have one thing in common, they emit coherent radiation. Laser oscillation in the B→X band of XeF at 350 nm has previously been demonstrated for electron beam, e-beam sustained, and discharge pumping of rare-gas-$NF_3$ (or $F_2$) gas mixtures. Efficiencies for this laser have been limited to ≲3% for e-beam operation (at room temperature) using Ne as the diluent and to 1% for excitation by a fast electric discharge. However, the ability of optical pumping to populate an electronic state of interest selectively has not preciously been applied to the excitation of the rare-gas-halide lasers.

Both rare-gas-halide and rare-gas-excimer radiation have been successfully utilized as optical pumps for lasers in the near-infrared to ultraviolet region of the spectrum. Rare-gas-halide fluorescence and laser radiation have been used to excite the I(1.3 μm) and In (0.451-μm) atomic lasers and the HgBr photodissociation laser. The attractive features of the rare-gas excimers as sources of incoherent pump radiation for electronic-state lasers have been pointed out by Murray and Rhodes, *J. Appl. Phys.*, Vol. 45, p. 5041, 1976, who investigated the use of $Xe_2^*$ or $Kr_2^*$ vacuum-ultraviolet (VUV) fluorescence as excitation sources for amplifiers (operating on the auroral and transauroral lines of selenium and sulfur) for eventual use in thermonuclear fusion studies. In particular the high fluorescence efficiencies (~50%) projected for the rare-gas excimers both experimentally and theoretically point to electron-beam-excited rare-gas plasmas as potentially efficient optical pumps for visible and ultraviolet lasers.

Since the initial demonstration of lasing from HgCl and HgBr utilizing electron-beam pumping, a surge of activity on the mercury-halide laser family has produced stimulated emission from HgCl and HgBr with e-beam-sustained and uv preionized discharge excitation of rare-gas/$Hg/Cl_2$ or $CCl_3Br$, mixtures. Unfortunately, chemical reaction of the mercury and halogen donor in these systems has forced the use of flowing gas mixtures or fresh gas fills for each laser pulse.

Recently, several investigators have successfully induced lasing on the B→X band of HgX(X=Cl, Br, or I) by dissociating the salt $HgX_2$ by electron impact. One of the attractive features of these dissociation lasers over the Hg/halogen donor chemical laser has been pointed out by Schimitschek and Celto, *Opt. Letters,* Vol. 2, page 64, 1978, who noted that the salt molecules appear to be recycled following dissociation and subsequent lasing. For example, $$HgCl(X) + Cl + He \rightarrow HgCl_2 + He + \Delta E.$$

This process has presumably enabled these devices to operate for long periods of time without any noticeable degradation of the output power/pulse.

This invention has been set forth in two publications "VUV Pumped HgCl LASERS", by J. Gary Eden, *Appl Phys. Letters, Vol.* 33, pp. 495–497, Sept. 15, 1978; and "XeF(B→X) Laser Optically Excited by Incoherent $Xe_2^*$ (172-nm) Radiation", by J. Gary Eden, *Optics Letters,* Vol. 3, pp, 94–96, September 1978. These publications are incorporated herein by reference.

SUMMARY OF THE INVENTION

Electrons excite a Xe gas surrounding a laser gaseous medium in a coaxial cylinder creating a large number of $Xe_2^*$ molecular excited species. These molecules radiate intensely in the vacuum ultraviolet region at a wavelength of 172 nm. The cylinder (VUV quality quartz) transmits at 172 nm so the incident 172 nm radiation photodissociates the laser gaseous medium producing laser radiation when appropriate mirrors are used to form a laser cavity. The laser gaseous medium is vapor from a solid fuel so the system can be made compact. Such lasers can be tuned over a limited wavelength range by adjusting the pressure of the gaseous medium inside the laser cell. The tuning is done without any frequency selective elements such as gratings, etc., inside the laser cavity.

DETAILED DESCRIPTION

Figure 1:
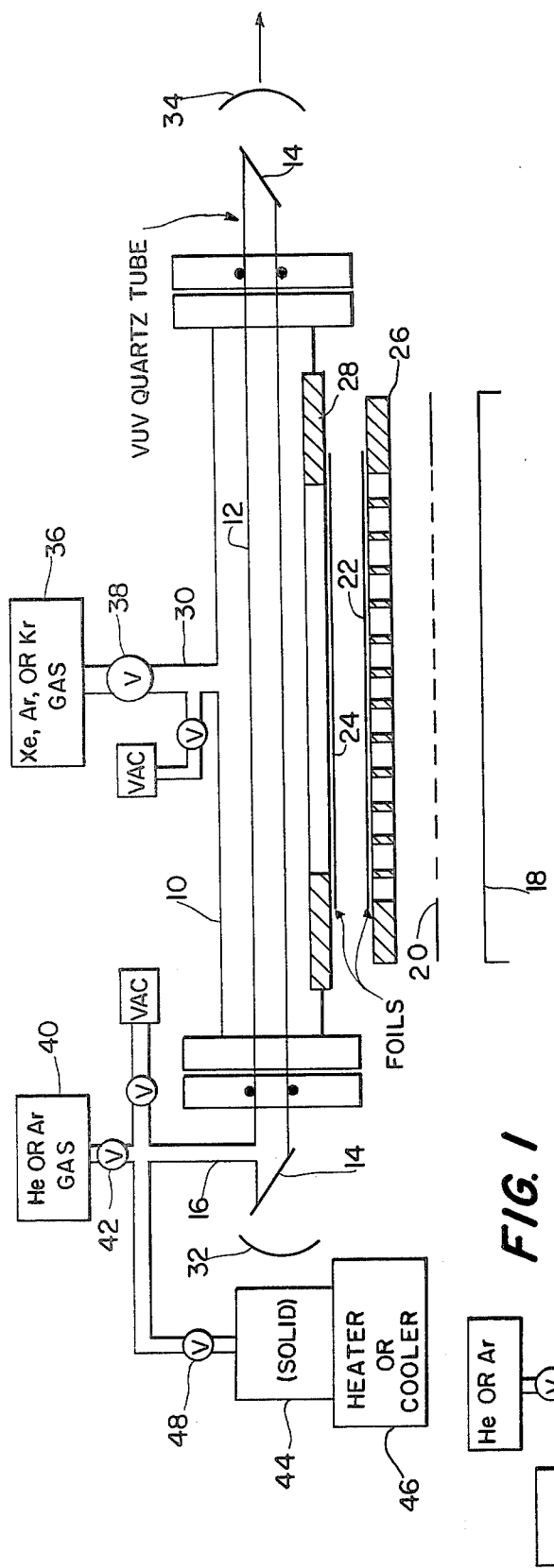
FIG. 1 is a partial schematic diagram of a photolytic laser cell.

Referring to the drawing, FIG. 1 illustrates a schematic diagram of a 36 mm-outside-diameter photolytic cell 10 having a wall thickness of ~2 mm, a length of 300 mm and a coaxially-aligned 12 mm-outside diameter, 430 mm-length, 1 mm-thickness, quartz laser tube 12. The quartz tube is closed at each end by use of Suprasil windows 14 fixed at Brewster's angle. The quartz tube is provided near one end with a gas inlet 16 which admits the laser gaseous medium to the quartz tube. The photolytic cell is formed by a cylindrical stainless-steel cell to which an electron beam generator is secured for delivering an intense (1 kA-cm$^{-2}$) electron beam. A suitable electron beam generator is an 8-ohm, water-filled, coaxial Blumlein generator driven by a LC generator which delivers a 50-nsec FWHM, 450-kV voltage pulse to a diode composed of a carbon cathode 18 and a stainless-steel mesh anode 20. For a diode gap of 1.5 cm, the beam current is about 110 kilo amps. After leaving the diode, the electron beam penetrates two 25 μm-thick titanium foils 22, 24 situated about 1 cm from the anode. One titanium foil (22) is secured to a 4 mm thick support plate 26 which is slotted with 42 cm$^2$ of open area and which transmits about 60% of the electron beam. The second titanium foil is secured to the stainless-steel photolytic cell opening frame 28. The support plate is secured to the photolytic cell. The spaces in FIG. 1 are expanded for the sake of clarity. Since one titanium foil is secured to the support plate and one foil is secured to the photolytic cell, each of the areas will be independently vacuum-tight so that the connection between the support plate and the photolytic cell need not be vacuum sealed. The structure surrounding the opening into the stainless-steel photolytic cell is rectangular so that the support plate can be secured thereto without any difficulty. The opening has a measurement of 3 cm by 14 cm. The stainless-steel cell has an inlet 30 for the admission of a gas such as Xenon, Argon and Krypton into the photolytic cell. The laser cavity includes two dielectric-coated spherical mirrors of 5-m radius of curvature separated by about 30 cm. One mirror 32 has a high reflectivity (99.5%) at 350 nm and the other mirror 34 has a transmission at that wavelength of about 4%.

The inlet 30 to the photolytic cell 10 is connected with a gas tank 36 which contains the gas to be admitted into the photolytic cell by control valve 38. The inlet 16 to the quartz tube 12 connects with gas tank 40 which is controlled by valve 42 and to a vial 44 which contains a solid. The gas from the tank 44 is controlled by valve 48.

As can be seen from above, the laser uses a solid fuel; (XeF$_2$ for the XeF laser) however, the solid has a vapor pressure of several Torr at room temperature so the solid is gradually converted to gas which then is used as a part of the laser medium. For some salts such as HgX$_2$, PbX$_2$, or SnX$_2$, however, the fuel must be heated 46 to obtain enough fuel molecules for lasing to occur (several Torr). For these lasers the following elements 12, 14, 10, 28, 24, 22 and 26 must be placed in an oven capable of going to ~300° C.

In carrying out the invention, the quartz and the stainless steel photolytic cells are evacuated to a pressure of less than 10$^{-5}$ Torr. Xenon gas is admitted to the photolytic cells to a pressure of from 2500 to 4500 Torr or higher. These pressures are required to efficiently form Xe$_2$* molecules after the Xe gas is irradiated by the e-beam. A gas such as a RGX$_2$ compound (where RG is a rare gas and X is a halogen atom), that can be synthesized and will create lasing from the RGX* molecule is admitted to the quartz tube at a pressure of from 0.5 to 3.0 Torr. Such compounds include XeF$_2$, XeCl$_2$ and KrF$_2$. Also HgCl$_2$, HgBr$_2$, SnBr$_2$, PbBr$_2$, and any other metal halide tri-atomic molecule are possible laser fuels. A buffer gas such as helium or argon at a pressure of from 100 to 700 Torr or greater is added to the quartz tube with the RGX$_2$. An electron beam directed into the photolytic cell excites the Xenon gas creating large numbers of Xe$_2$* molecular excited species. These molecules radiate intensely in the vacuum ultraviolet at 172 nm. The radiation at 172 nm is transmitted into the quartz tube. Irradiation of the RGX$_2$ gas in the buffer gas results in a rapid photodissociative production of RGX (B) state molecules to create the upper laser level. For instance:

$$XeF_2 + h\nu \rightarrow XeF(B) + F + \Delta E$$

where the excess energy of the reaction, $\Delta E$, goes into vibrational excitation of the XeF(B) state molecule. The intensity of the Xe$_2$* emission is sufficiently high that a population inversion of the B→X band of XeF is attained and lasing is obtained when appropriate mirrors are placed at the ends of the laser cavity. Further, the laser cell includes windows at Brewster's angle.

Figure 2:
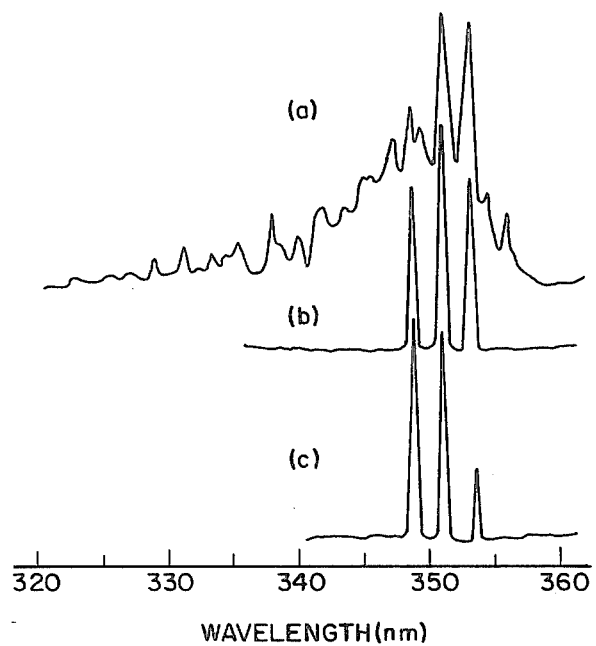
FIG. 2 is a comparison of (a) the fluorescence spectrum obtained with photolysis of a 2.0-Torr $XeF_2$, 700-Torr He mixture (b) laser spectrum using high-reflectivity mirrors with said gases, and (c) laser emission with 2.0-Torr $XeF_2$, and 400-Torr He mix, each of the above had 2500 Torr of Xe in the coaxial chamber.

A typical example of the operation of the photolytic laser involves filling the stainless-steel cell with about 2500 Torr Xe and the quartz laser tube with from 0.5 to 3.0 Torr XeF$_2$ and from 100 to 700 Torr He or Ar. The spontaneous and laser emission for 2 Torr XeF$_2$ and 700 Torr He are shown in FIG. 2(*a*) and FIG. 2(*b*), respectively.

Note that dominant XeF* fluorescence originates from low-lying XeF(B) vibrational levels, although some emission out to ~330 nm is observed. Laser oscillation occurs at 349, 351, and 353 nm, which have been identified as (v′, v″)=(2,5), (1,4), and (0,3) transitions of the B→X band of XeF, respectively. Collisional relaxation of the B-state population has an obvious effect on the laser spectrum, as shown in FIG. 2(*c*), which shows the lasing lines obtained with a 2.0-Torr XeF$_2$+400-Torr He mixture. With no He in the quartz cell, stimulated emission is obtained on the 349-nm line only; the other transitions appeared above ~50-Torr He. Relaxation of the upper-state vibrational manifold presumably explains why the 349 transition has not been seen in e-beam-excited XeF lasers and is weak in discharge-pumped systems.

Figure 3:
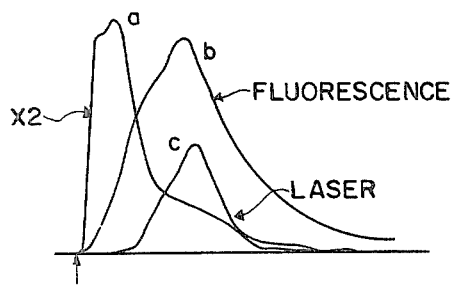
FIG. 3 illustrates, fluorescence and laser emission waveforms for the gases as set forth in FIG. 2.

Laser and spontaneous-emission waveforms are presented in FIG. 3. With the outer excitation cell evacuated, a small amount of XeF(B→X) emission is observed as shown in FIG. 3 (trace *a*). Since this fluorescence was observed only with the excitation cell evacuated, then the waveform of FIG. 3, (trace *a*) is likely due to XeF pumping from radiation emitted by the e-beam striking the quartz cell. Also, laser emission could not be obtained under these conditions. However, with the addition of 2500-Torr Xe to the outer cell, the 350-nm fluorescence increases greatly (FIG. 3, trace *b*), and, though delayed in time with respect to the start of the e-beam current, the XeF emission closely follows the Xe$_2$* pump pulse (not shown).

Figure 4:
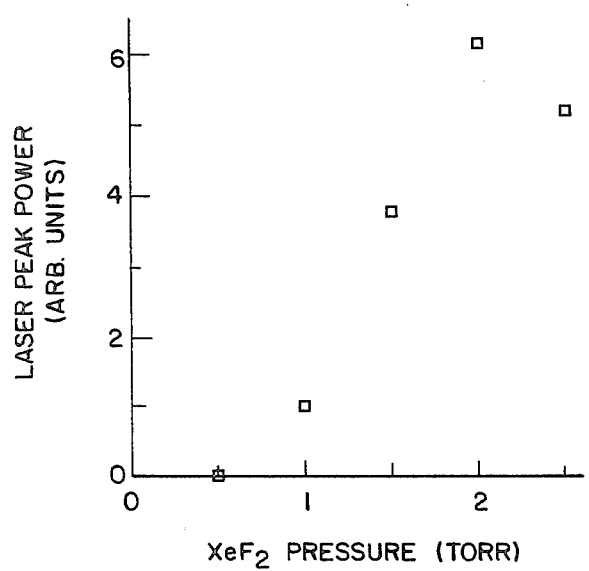
FIG. 4 illustrates variations of photolytic laser peak power with $XeF_2$ for different pressures of $XeF_2$ with the He and Xe pressures fixed for each different $XeF_2$ pressure.
Figure 5:
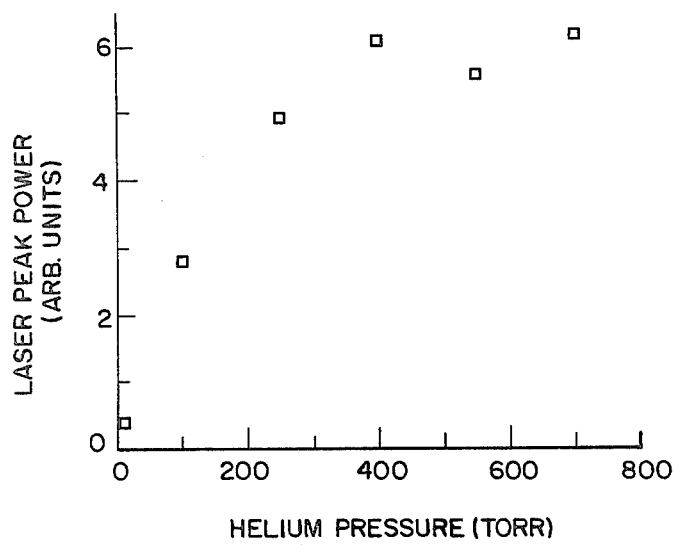
FIG. 5 illustrates the dependence of peak power on helium pressure for fixed $XeF_2$ pressure at 2.0 Torr.

As shown in FIG. 3 (trace *c*), the laser emission follows the fluorescence after a delay of ~25 nsec. Measurements of the peak laser power as a function of XeF$_2$ and He partial pressures in the gas mixture are shown in FIGS. 4 and 5. The steep rise of laser power in FIG. 4 is due to the increasing optical thickness of the photolytic medium, and the inflection in the curve at 2-Torr XeF$_2$ reflects the large rate constant for quenching of XeF(B) by XeF$_2$ measured as 2.6×10$^{-10}$ cm$^3$sec$^{-1}$. In contrast, helium is known to quench the exciplex at a relatively slow rate (4×10$^{-13}$ cm$^3$sec−1) thus the rare gas serves only to equilibrate the XeF* vibrational manifold, which presumably occurs for rare gas pressures >400 Torr (see FIG. 5).

The maximum laser power realized from a high-Q optical cavity (mirror transmission ~0.1%) is ~1.3 kW in a ~30-nsec FWHM pulse, for an integrated energy of ~0.04 mJ. Axial spectra of the lasing medium confirm that power extraction in these experiments is poor since significant fluorescence from high-lying XeF vibrational levels is observed during lasing (i.e., manifold relaxation time is long compared with the laser pulse). Therefore, higher He buffer pressures and greater output-mirror coupling are required to exploit the efficiency of this laser fully.

The quantum efficiency of the XeF photodissociation laser using the approach described above is:

$$\eta_{max} \approx \frac{1}{2}[h\nu(351\ nm)/h\nu(172\ nm)] \approx 24\%,$$

where the fluorescence efficiency of e-beam-excited xenon is taken to be 50% and the quantum yield for production of the XeF(B) state (when $XeF_2$ absorbs a 172-nm photon) is assumed to be unity. Of course, the efficiency of the vacuum-ultraviolet radiation to the $XeF_2$ vapor will limit the maximum efficiency attainable for this system.

The photolytic XeF laser has several advantages over conventional-discharge or e-beam-pumped systems. The low-pressure ($\lesssim$1-atm) laser medium avoids the index-of-refraction gradients in the lasing volume [experienced in high-pressure (2–5-atm) XeF lasers] that deteriorate beam quality. Also, pumping is selective and clean—the pumping process does not create optically absorbing fragments as is the case with $NF_3$ in e-beam-pumped rare-gas-fluoride lasers. Since the laser fuel is a solid, the design of more-compact laser becomes feasible. As seen from above, incoherent optical pumping of the XeF laser has been demonstrated. Stimulated emission at 349, 351, and 353 nm was obtained by photolyzing $XeF_2$ with $Xe_2^*$ 172-nm spontaneous emission.

Stimulated emission on the (0,22), and (1,23) lines of the B→K band of HgCl, by photodissociating $HgCl_2$ with the vacuum ultraviolet (vuv) spontaneous emission from the $Xe_2$ excimer, has also been obtained and is described herein. The quartz laser cell was baked out under a vacuum $\leq 10^{-5}$ Torr and filled with one (1) Torr of $HgCl_2$ and 200 Torr of He. For this laser the reflective cavity mirror must be 99.5% reflective at 557 nm and the partially reflective mirror operative to pass radiation in the range of 557 nm. Approximately 5000 Torr of Xe was admitted to the photolytic stainless steel tube. The Xe was excited by an electron beam as described above to excite the Xenon to produce a fluorescence of 172-nm.

Figure 6:
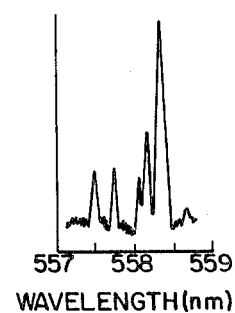
FIG. 6 illustrates the laser spectrum of photolyzed $HgCl_2$.

The spectrum emitted by 172-nm photolyzed $HgCl_2$ reveal that only the HgCl(B→X) band is produced. Although peak fluorescence occurs around 557 nm, significant emission can be seen out to 500 nm. Stimulated emission occurs on both the (1,23) and (0,22) lines of the B→X band of HgCl at 558.4 and 557.4 nm, respectively. Strongest lasing is observed on the $\nu'=1 \to \nu''=23$ transition. FIG. 6 shows the laser spectrum under high resolution (0.1 nm). Although the resolution is insufficient to resolve individual rotational lines some structure due to groups of high rotational levels (J=50) of the HgCl (b,$\nu'=0$ and 1) states is evident.

With a 4% output coupler, a laser output of several $\mu$J in a 50 ns FWHM pulse was obtained In addition to the above examples it has been determined that KrF, from photodissociation of $KrF_2$ will have an output at 249 nm.

XeCl, from photodissociation of $XeCl_2$, should have an output of 308 nm. Although $XeCl_2$ has not yet been synthenized in sufficient quantities to be useful in this device. Other examples are:

$SnBr_2 \to SnBr$ laser
$SnCl_2 \to SnCl$ laser
$PbBr_2 \to PbBr$ laser.

From the listing included herein it is believed that virtually any metal-halide tri-atomic molecule can be used as a laser fuel.

Further improvement in the performance of this device can be obtained if the pumping of the xenon photolytic medium were more uniform. Transverse pumping as described herein is certainly not optimal. Using a $MgF_2$ overcoated aluminum reflector in the photolytic cell (on the inside surface of the electron beam anode) and pumping the rare gas with a coaxial e-beam as shown in FIG. 7 will improve the system's efficiency considerably.

Figure 7:
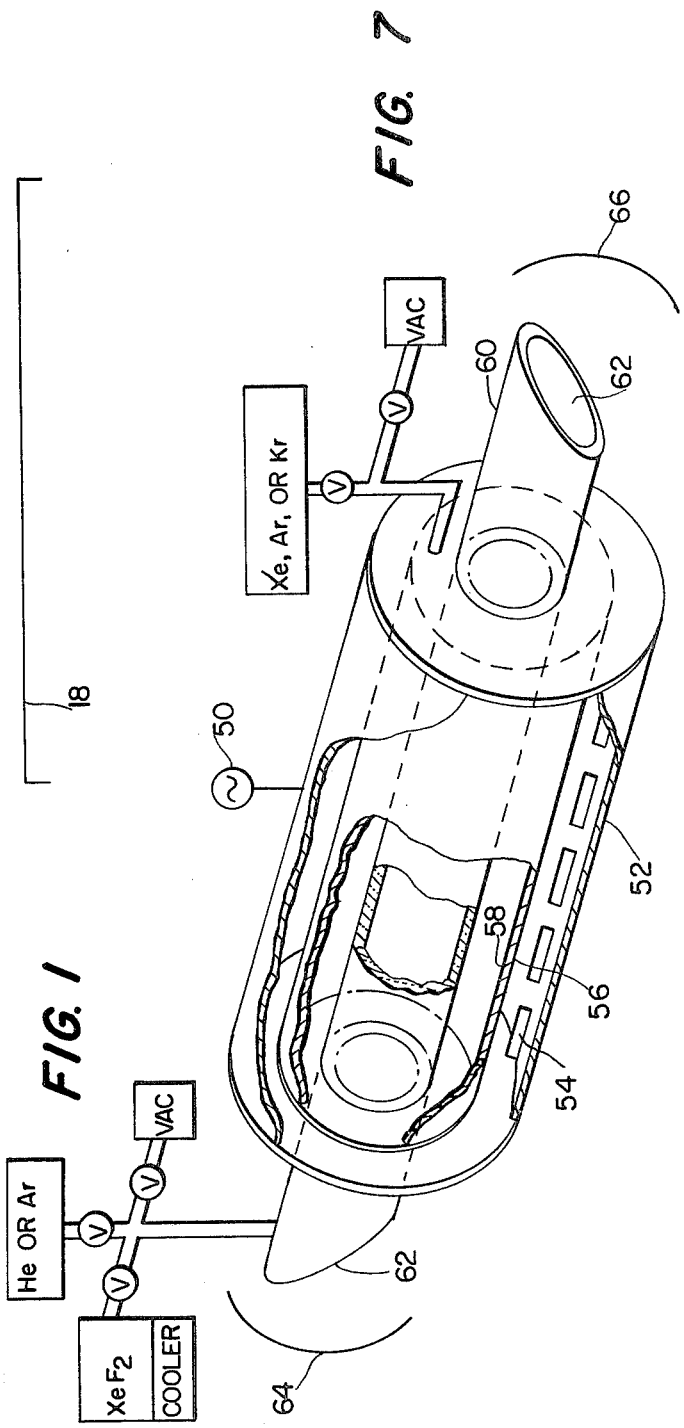
FIG. 7 illustrates a schematic drawing with a cylindrical geometry for the E-beam cathode and anode coaxial with the laser tube.

As shown in FIG. 7 the e-beam surrounds the photolytic cell laser tube and is coaxial therewith. The system includes an electron generator 50, an outer cylindrical e-beam cathode 52 which has protruding knife edges, or razor blades, 54 which aid in the emission of electrons. The cathode is coaxial with and surrounds a cylindrical e-beam anode 56 formed of a thin foil of titanium or any other suitable material. The annular region between the e-beam cathode and anode is maintained at a vacuum so that the electrons are free to move toward the anode. The e-beam anode forms the outer cylindrical wall for the photolytic cell and the surface toward the axis is coated with aluminum 58 to a thickness of about 1000 Å and overcoated with $MgF_2$ for vacuum ultraviolet reflectivity. The e-beam anode surrounds a quartz tube 60 and is coaxial therewith. The area between the e-beam anode and the quartz tube is filled with Xenon gas at a pressure of from 2500 Torr to 5000 Torr. The quartz tube forms the laser cell and includes end windows 62 at Brewster's angle. The quartz tube is filled with a suitable laser gas-buffer gas as set forth above for the device shown in FIG. 1 and is provided with appropriate mirrors 64 and 66 which form the laser cavity. A similar structure is shown in U.S. Pat. No. 4,087,763.

Lasers such as described in each of the modifications above can be tuned over a limited wavelength range without any additional elements placed within the system by adjusting the pressure of the buffer gas inside the laser cell. FIG. 2 illustrates the laser spectrum for a buffer gas pressure of 700 Torr He (curve b) and for 400 Torr He (curve c). The pressure of the $XeF_2$ was maintained at the same pressure for each case.

Obviously many modifications and variations of the present invention are possible in light of the above teachings. It is therefore to be understood that within the scope of the appended claims the invention may be practiced otherwise than as specifically described.

What is claimed is:

1. Apparatus for producing monochromatic coherent radiation which comprises:
   a first cylindrical elongated means containing a mixture of a $RGX_2$ gas and a buffer gas, wherein RG is a rare gas or metal ion and X is a halogen ion, and the $RGX_2$ gas is capable of photolysis to form an optically active RGX gas having an inverted population state;
   a second cylindrical elongated means surrounding said first cylindrical means in coaxial relationship therewith and containing a fluorescer gas having an emission frequency sufficient to effect photolysis of the $RGX_2$ gas and form an optically active RGX gas having an inverted population state;
electron-producing means for exciting said fluorescer gas,
said first cylindrical means including end windows at Brewster's angle; and
a fully reflective mirror and a partially reflective mirror in optical alignment with said first cylindrical means forming a resonant laser cavity.

2. Apparatus as claimed in claim 1 wherein:
said $RGX_2$ gas is a material selected from the group consisting of:
$XeF_2$, $KrF_2$, $XeCl_2$, $HgCl_2$, $HgBr_2$, $HgI_2$, $SnBr_2$, $PbBr_2$, $SnCl_2$, $SnI_2$, $PbI_2$, and $PbCl_2$.

3. Apparatus as claimed in claim 1 wherein:
said buffer gas is He or Ar.

4. Apparatus as claimed in claim 1 wherein:
said fluorescer gas is Xenon, argon, or krypton.

5. Apparatus as claimed in claim 3 wherein:
said fluorescer gas is Xenon.

6. Apparatus as claimed in claim 3 wherein:
said $RGX_2$ gas is $XeF_2$ at a pressure of from 0.3 Torr to about 3.0 Torr; and
said buffer gas is He at a pressure of from 500 to 1000 Torr.

7. Apparatus as claimed in claim 5 wherein:
said Xenon fluorescer gas is at a pressure greater than 2500 Torr.

8. Apparatus as claimed in claim 6 wherein:
said $XeF_2$ gas is at a pressure of 2.0 Torr;
said buffer gas of He is at a pressure of 700 Torr, and
said fluorescer gas is Xenon at a pressure greater than 2500 Torr.

9. Apparatus as claimed in claim 8 wherein:
said electron-producing means produces an elongated e-beam travelling normally to the axis of said first and second cylindrical, elongated means.

10. Apparatus as claimed in claim 8 wherein:
said electron producing means is cylindrical and in coaxial relationship with said first and second cylindrical, elongated means.

11. Apparatus as claimed in claim 1 wherein:
said $RGX_2$ gas is $XeF_2$, and
said buffer gas is argon.

12. Apparatus as claimed in claim 1 wherein:
said $RGX_2$ gas is $HgCl_2$, and
said buffer gas is He.

13. Apparatus as claimed in claim 1 wherein:
said $RGX_2$ gas is $HgCl_2$, and
said buffer gas is argon.

14. Apparatus as claimed in claim 1 wherein:
said $RGX_2$ gas is $XeCl_2$, and
said buffer gas is He.

15. Apparatus as claimed in claim 1 wherein:
said $RGX_2$ gas is $XeCl_2$, and
said buffer gas is argon.

16. A laser device comprising:
a container containing $RGX_2$ molecules capable of photolysis to form optically active RGX molecules having given energy levels and an inverted population state between certain ones of the given energy levels, where RG is a rare gas or metal ion and X is a halide ion;
regeneration means exhibiting high reflectance at given wavelengths optically coupled to end portions of the container for forming an optical resonant cavity; and
pump means coupled to the container for effecting photolysis of the $RGX_2$ molecules to form optically active RGX molecules having given energy levels and an inverted population state between certain ones of the given energy levels,
whereby light is coherently emitted from the container at a frequency corresponding to the energy difference between the certain ones of the given energy levels and at wavelengths corresponding to the given wavelengths.

17. The laser device recited in claim 16 wherein:
the $RGX_2$ gas is a material selected from the group consisting of $XeF_2$, $KrF_2$, $XeCl_2$, $HgCl_2$, $HgBr_2$, $HgI_2$, $SnBr_2$, $PbBr_2$, $SnCl_2$, $SnI_2$, $PbI_2$, and $PbCl_2$.

18. The laser device recited in claim 16 wherein:
the container also contains a buffer gas, the frequency of the coherently emitted light being varied by variation of the pressure of the buffer gas.

19. The laser device recited in claim 18 wherein:
the buffer gas is He or Ar.

* * * * *